United States Patent [19]

Jubinski

[11] Patent Number: 4,630,884

[45] Date of Patent: Dec. 23, 1986

[54] METHOD AND APPARATUS FOR MONITORING OPTICAL FIBER LAPPING AND POLISHING

[75] Inventor: Paul Jubinski, Houston, Tex.

[73] Assignee: Western Geophysical Co. of America, Houston, Tex.

[21] Appl. No.: 647,226

[22] Filed: Sep. 4, 1984

[51] Int. Cl.⁴ .......................... G02B 6/26; G02B 6/42
[52] U.S. Cl. .............................. 350/96.15; 350/96.32
[58] Field of Search ................ 350/96.15, 96.32, 96.29

[56] References Cited

U.S. PATENT DOCUMENTS

| | | | |
|---|---|---|---|
| 3,566,172 | 2/1971 | Taylor et al. | 350/96.32 |
| 4,286,839 | 9/1981 | Ilzig et al. | 350/96.32 |
| 4,431,260 | 2/1984 | Palmer | 350/96.15 |
| 4,588,255 | 5/1986 | Tur et al. | 350/96.15 |

Primary Examiner—William L. Sikes
Assistant Examiner—Robert E. Wise
Attorney, Agent, or Firm—Barry C. Kane

[57] ABSTRACT

In this invention, the depth of lapping an optical flat on optic fibers is monitored while the fiber is mounted on the lapping fixture. A collimated light beam is tangentially incident upon the optical flat. A portion of the incident light is transmitted into the optic fiber. A light intensity monitor coupled to the end of the optic fiber measures the amount of transmitted light relative to a standard value. The amount of light transmitted is a function of the surface area of the optical flat. A monitor measurement of a predetermined intensity level indicates sufficient material has been removed from the optical fiber.

7 Claims, 4 Drawing Figures

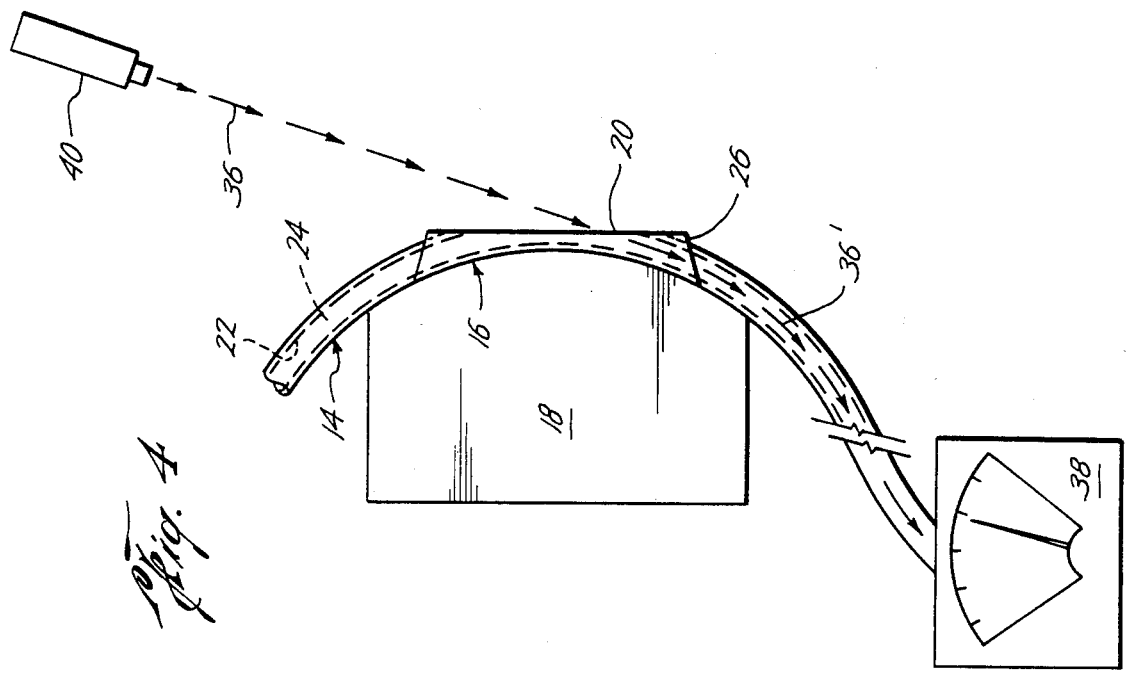
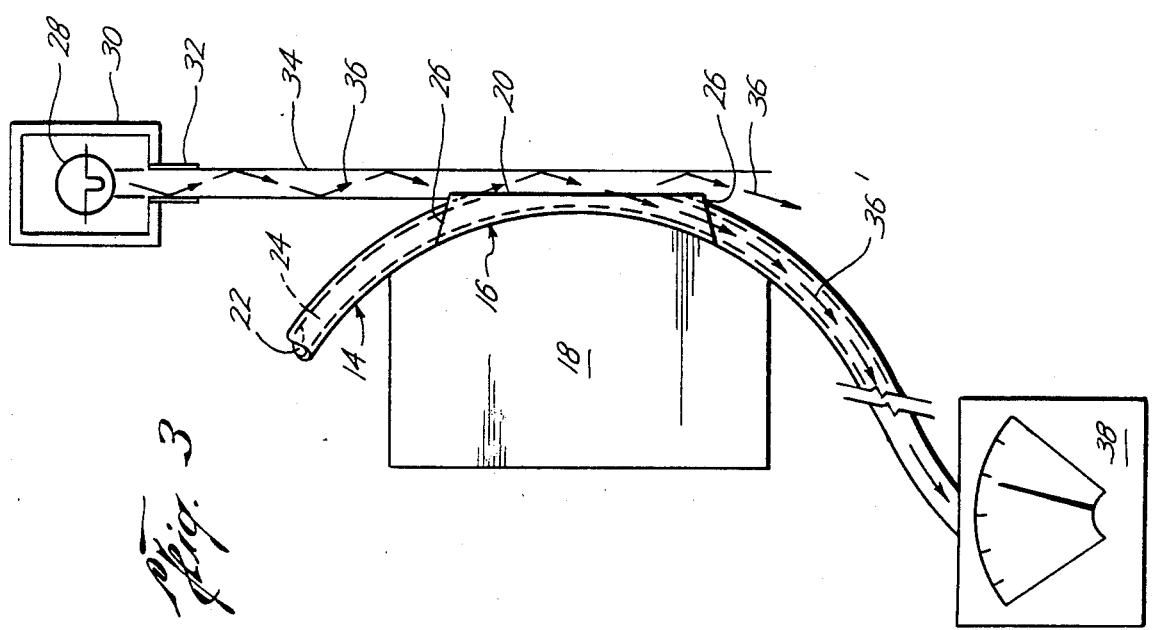

METHOD AND APPARATUS FOR MONITORING OPTICAL FIBER LAPPING AND POLISHING

BACKGROUND OF THE INVENTION

1. Field of the Invention

This invention relates to fiber optic couplers and, more particularly, to a method for monitoring optical fiber lapping and polishing.

2. Description of the Prior Art

Optical energy transmission between parallel, optical waveguides is made possible by the interaction of evanescent electromagnetic fields. This interaction has been used efficiently in the last few years to develop optic-fiber couplers.

In optic fibers, electromagnetic energy is largely transmitted along a high refractive index core. Surrounding the optic core is a low refractive index cladding that provides optical insulation and protection. Evanescence or dispersion of transmitted energy occurs from the optic core outwards to the cladding. The amount of energy extending out from the core decays exponentially with radial distance from the core axis.

Bi-directional optic-fiber couplers rely upon evanescent characteristics for transfer of optical energy between waveguides. A curved optic fiber exhibits energy loss because of evanescence. Optical energy escapes outwards from the convex portion of the curved optic fiber along a plane passing through the optic fiber core and containing the curve. The inverse is true of optical energy incident upon the outer curved portion of the fiber. The amount of optical energy lost or gained increases with a loss of the optic fiber cladding. U.S. Pat. No. 4,431,260 issued to Palmer teaches a method of fabricating a bi-directional optic coupler.

The preferred technique for grinding an optical flat on a fiber implements a mechanical lapping procedure, providing mechanical stability, and precision reproducibility. In this technique, an optic fiber is mounted in a groove on a curved form with a radius of curvature typically between 5 cm and 8 cm. Epoxy adhesive holds the fiber on the form.

Several optic fiber forms are coupled to a lapping fixture which is mounted on a lapping and polishing machine. An optical flat is lapped on the convex portion of each of the optic fibers, nearly exposing a region of optic-fiber core. Two such fibers are placed in face-to-face contact for the required proximity of the evanescent field interactions. Matching index oil is absorbed between the flats by capillary attraction, providing optical homogeneity. The splitting ratio is fine tuned by aligning the fiber surfaces.

Because of the spatial relationship of the fiber cores, there is a high degree of evanescent coupling between the transmitting fiber and the receiving fiber. Maximum transmission depends on the optic fiber thickness, radius of curvature, and the area of the optic flat. Usually, optic-fiber flats are lapped into the cladding to within a few microns of the core.

The depth of the optic-flat surface is determined by microscopically measuring the cross-sectional area of the flat. This process is tedious, for it requires that the optic fibers be removed from the lapping fixture, washed, measured, and replaced on the fixture. This process may be repeated several times before the desired depth is achieved, and usually takes many hours.

It is the purpose of my invention to increase optic flat production by reducing the time of the lapping process.

SUMMARY OF THE INVENTION

This invention provides a means for monitoring the lapping depth of optic fibers in evanescent coupler manufacturing. A collimated radiant energy beam is transmitted onto the optical flat periodically during the lapping process. A light intensity monitor (photometer) coupled to the optic fiber end, measures the light transmission intensity of the transmitted beam. The amount of light entering the optic fiber is related to the amount of cladding material removed from the optic fiber. A predetermined intensity level will indicate sufficient optic fiber cladding has been removed for evanescent coupling.

BRIEF DESCRIPTION OF THE DRAWINGS

A better understanding of the benefits and advantages of my invention may be obtained from the appended detailed description and the drawings, wherein:

FIG. 3 illustrates the method and apparatus for monitoring the lapping depth of optical flats; and FIG. 4 shows a laser as a light source.

DETAILED DESCRIPTION OF THE PREFERRED EMBODIMENT

Figure 1:
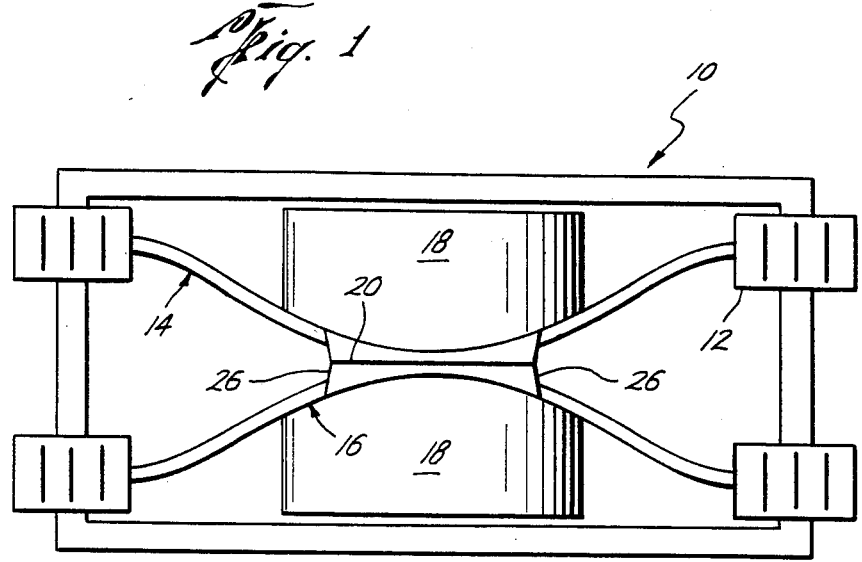
FIG. 1 is a diagram of an evanescent optic coupler.

FIG. 1 illustrates a bi-directional evanescent optic coupler 10 consisting of optical connectors 12 coupled to respective ends of optic fibers such as 14. Optic fibers 14 are conformably mounted on a curved surface 16 of a lapping mandrel 18. Optic fiber flats are in intimate contact along line 20.

Figure 2:
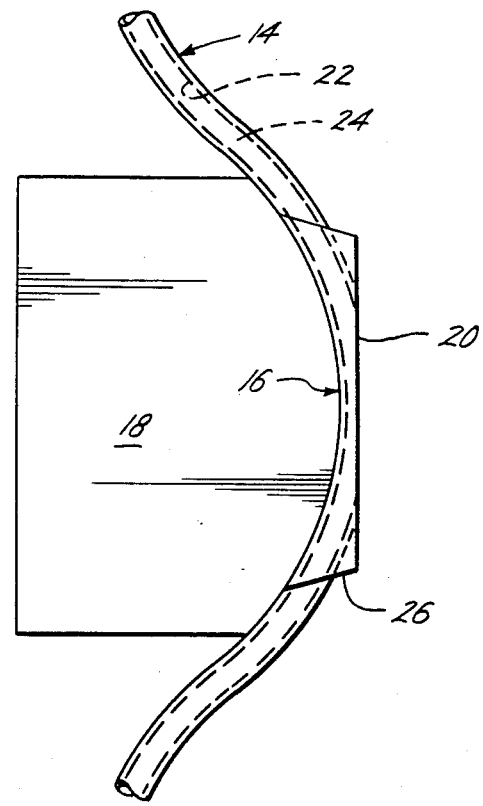
FIG. 2 depicts an optic fiber mounted on a lapping block.

FIG. 2 more clearly illustrates an optic fiber 14 consisting of a fiber cladding 22, and core 24, flushly mounted on curved surface 16 of lapping mandrel 18 by adhesive 26. Surface 20 represents the plane along which optic fiber cladding 22, and adhesive 26 are stripped away by lapping and polishing.

FIG. 3 illustrates the method and apparatus for monitoring the lapping depth of optical flats. Optic fiber 14 is mounted to the curved surface 16 of lapping mandrel 18 as previously described. Mandrel 18 is mounted on a lapping fixture (not shown). The lapping fixture may be any suitable device for maintaining rigidity of lapping mandrels 18 during the lapping process.

At intervals during the lapping process, the lap (not shown) is backed away relative to optic fiber 14 and lapping mandrel 18. A source of radiant energy 28 is positioned within the lubricating fluid reservoir 30 directly above the fluid outlet 32. Lubricating fluid 34, transparent to the radiant energy flows out of outlet 32 in a laminar stream. A long-chain polymer such as polypropylene or other suitable additives may be mixed with the lubricating fluid to improve laminar flow from outlet 32. Fluid column 34 acts as an optical waveguide, directing radiant energy 36 from source 28 upon lapped surface 20. A portion of beam 36 is evanescently coupled between fluid column 34 into optic fiber 14 across surface 20. A light intensity monitor such as a photometer 38, measures the relative intensity level of transmitted radiant energy 36' propagating within optic fiber 14. A predetermined intensity level registered on monitor 38 indicates the proper lapping depth.

Referring to FIG. 4, collimation of radiant energy beam 36 may be accomplished by using a coherent beam laser 40 outside of lubricating fluid column 34 seen in FIG. 3. The wavelength of the radiation beam emitted by laser 40 may be of any desired value but preferably of a length that will be used in the finished optical system. In one embodiment, the continuous flow of fluid 34 over optical flat 20 is needed only during the lapping process. When fluid flow is shut off, a remaining residual film of lubricating fluid acts to polish the lapped surface on optical flat 20. The laser beam is directed at the lapped portion of the optical fiber at a desired angle of incidence to couple the laser beam into the optical fiber. The angle of incidence is best determined empirically.

In another embodiment of this invention, optic fiber 14 may be retained against the convex surface 16 of lapping mandrel 18 by means of a well-known vacuum chuck. The vacuum chuck can consist of a longitudinal groove of suitable radius incised in the convex surface 16. The groove is in fluid communication with a vacuum pump, which when activated, creates a vacuum between optic fiber 14 and lapping mandrel 18.

For illustrative purposes, my invention has been described with a certain degree of specificity. Variations will occur to those skilled in the art but which are included within the scope and spirit of this invention which is limited only by the appended claims.

I claim as my invention:

1. An apparatus for monitoring the removal of optical cladding from an optical fiber during the lapping of an optical flat thereon, said optical fiber mounted on a convex surface of a mandrel coupled to a lapping fixture of a lapping and polishing device, comprising:
   means for generating a beam of radiation;
   means for evanescently coupling said beam of radiation across said optical flat and into said optical fiber; and
   means for measuring an intensity level of said radiation evanescently coupled into said optical fiber, and intensity level and function of the amount of optical cladding removed from said optical fiber.

2. The apparatus as defined by claim 1 wherein said means for evanescently coupling includes a laminar-flowing stream of a fluid that is transparent to said radiation so that said fluid acts as a fluid optical waveguide, said stream of fluid being directed against the lapped portion of said optical fiber.

3. The apparatus as defined by claim 1, wherein said means for generating a beam of radiation comprises:
   a laser characterized by emission of radiation of a desired wavelength; and
   said beam of radiation from said laser coupled into said optical fiber by directing said beam upon said optical flat at a predetermined angle of incidence.

4. An apparatus for monitoring the removal of optic-fiber cladding, by lapping during the manufacture of optic-fiber couplers, comprising:
   a mandrel having a convex surface;
   an optic fiber conformingly mounted to said convex surface;
   means for retaining said optic fiber against said convex surface;
   an optical flat tangentially lapped on said optic fiber;
   a fluid optical waveguide directed against said optical flat;
   a source of radiation for transmitting radiation into said fluid optical waveguide, thereby to evanescently couple said radiation into said optical fiber;
   a radiation intensity monitor coupled to said optic fiber, for measuring the intensity level of radiation coupled into said optic fiber, said intensity level being a function of the amount of cladding removed from said optic fiber.

5. The apparatus as defined by claim 4, comprising:
   means for providing laminar flow of said fluid waveguide.

6. In an optical fiber to be used as a component of an evanescent optical coupler, a method for measuring the amount of cladding removed from the fiber during lapping of a flat surface thereon, comprising:
   contacting the flat surface of said optical fiber with a fluid optical waveguide;
   directing a source of radiation into said fluid optical waveguide; and
   measuring the intensity level of the radiation coupled into said optical fiber from said fluid optical waveguide.

7. The method as defined by claim 6 comprising the step of:
   adding a desired long-chain polymer to said fluid optical waveguide so that said fluid optical waveguide has a laminar flow.

* * * * *